US010142893B2

(12) United States Patent
Rous et al.

(10) Patent No.: US 10,142,893 B2
(45) Date of Patent: Nov. 27, 2018

(54) PREDICTIVE RESERVATION OF RADIO CELLS FOR INTERRUPTION-FREE COMMUNICATION WITH A DATA CLOUD

(71) Applicant: Robert Bosch GmbH, Stuttgart (DE)

(72) Inventors: Martin Rous, Mundelsheim (DE); Volker Hofsaess, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/522,404

(22) PCT Filed: Sep. 10, 2015

(86) PCT No.: PCT/EP2015/070678
§ 371 (c)(1),
(2) Date: Apr. 27, 2017

(87) PCT Pub. No.: WO2016/074820
PCT Pub. Date: May 19, 2016

(65) Prior Publication Data
US 2017/0325136 A1 Nov. 9, 2017

(30) Foreign Application Priority Data
Nov. 10, 2014 (DE) .................. 10 2014 222 840

(51) Int. Cl.
H04W 36/00 (2009.01)
H04W 4/029 (2018.01)
(52) U.S. Cl.
CPC ....... H04W 36/0061 (2013.01); H04W 4/029 (2018.02); H04W 36/0072 (2013.01); H04W 36/0083 (2013.01)

(58) Field of Classification Search
CPC ............ H04W 36/0061; H04W 4/028; H04W 36/0083
See application file for complete search history.

(56) References Cited

U.S. PATENT DOCUMENTS 7,664,068 B1 * 2/2010 Ho ................... H04W 72/0446
370/312
8,787,917 B1 * 7/2014 Barrett .............. G01C 21/3461
455/445
(Continued)

FOREIGN PATENT DOCUMENTS

EP 1401229 A1 * 3/2004 ............ H04W 36/32
EP 2667658 A1 * 11/2013 ............ H04W 28/26
(Continued)

OTHER PUBLICATIONS

International Search Report dated Dec. 7, 2015, of the corresponding International Application PCT/EP2015/070678 filed Sep. 10, 2015.
(Continued)

Primary Examiner — Mehmood B. Khan
(74) Attorney, Agent, or Firm — Norton Rose Fulbright US LLP; Gerard Messina

(57) ABSTRACT

A method for operating a terminal for a communication network, the terminal, based on a future route of the terminal, transmitting a reservation request for logging into a radio cell of the communication network along the route via the communication network to a radio cell management server, to be able to log into the requested radio cell as a function of a response of the radio cell management server. A method for operating a radio cell management server, a terminal, a radio cell management server, a vehicle, and a computer program, are also described.

20 Claims, 2 Drawing Sheets

(56) References Cited

U.S. PATENT DOCUMENTS

| | | | | |
|---|---|---|---|---|
| 2004/0058678 A1* | 3/2004 | deTorbal | | H04W 36/32 |
| | | | | 455/437 |
| 2004/0192341 A1* | 9/2004 | Wang | | H04W 28/26 |
| | | | | 455/456.1 |
| 2006/0245394 A1* | 11/2006 | Baba | | H04W 36/0011 |
| | | | | 370/331 |
| 2009/0163223 A1* | 6/2009 | Casey | | H04W 36/22 |
| | | | | 455/453 |
| 2010/0240375 A1* | 9/2010 | Ahluwalia | | H04L 5/0053 |
| | | | | 455/439 |
| 2011/0051642 A1* | 3/2011 | Krishnaswamy | | H04W 40/10 |
| | | | | 370/311 |
| 2012/0230260 A1* | 9/2012 | Virtej | | H04W 4/02 |
| | | | | 370/329 |
| 2012/0257527 A1* | 10/2012 | Jorgensen | | H04L 1/20 |
| | | | | 370/252 |
| 2013/0115954 A1* | 5/2013 | Charbit | | H04W 36/32 |
| | | | | 455/437 |
| 2014/0274064 A1* | 9/2014 | Al-Shalash | | H04W 24/08 |
| | | | | 455/437 |
| 2014/0315564 A1* | 10/2014 | Conway | | H04W 4/029 |
| | | | | 455/452.1 |
| 2014/0355549 A1* | 12/2014 | Ho | | H04W 74/006 |
| | | | | 370/329 |
| 2014/0376430 A1* | 12/2014 | Su | | H04W 52/0212 |
| | | | | 370/311 |
| 2015/0078276 A1* | 3/2015 | Nagasaki | | B60L 15/40 |
| | | | | 370/329 |
| 2015/0117995 A1* | 4/2015 | D'Andrea | | G06Q 10/08 |
| | | | | 414/467 |
| 2016/0014793 A1* | 1/2016 | Klemp | | H04W 48/18 |
| | | | | 370/329 |
| 2017/0201925 A1* | 7/2017 | Chong | | H04W 48/18 |
| 2018/0001916 A1* | 1/2018 | Aoyama | | B61L 3/12 |

FOREIGN PATENT DOCUMENTS

| | | | | |
|---|---|---|---|---|
| GB | 2387295 A | | 10/2003 | |
| GB | 2389015 A | | 11/2003 | |
| GB | 2439432 A | * | 12/2007 | ........ H04W 36/0055 |
| GB | 2439432 A | * | 12/2007 | ........ H04W 36/0055 |
| GB | 2496165 A | * | 5/2013 | ............ H04W 36/32 |
| JP | 2014003355 A | | 1/2014 | |
| JP | 2014011951 A | | 1/2014 | |

OTHER PUBLICATIONS

Gunwoo Kim et al.: "A structured TDMA-based V2I MAC protocol for automated guided vehicle control systems," Information Networking (ICOIN), 2012 International Conference on, IEEE, Feb. 1, 2012, p. 154-158.

* cited by examiner

PREDICTIVE RESERVATION OF RADIO CELLS FOR INTERRUPTION-FREE COMMUNICATION WITH A DATA CLOUD

FIELD

The present invention relates to a method for operating a terminal and a terminal. The present invention furthermore relates to a method for operating a radio cell management server and a radio cell management server. The present invention furthermore relates to a vehicle and a computer program.

BACKGROUND INFORMATION

In general, cloud-based driving functions are absolutely required for partially-automated and fully-automated driving functions. Examples are present friction coefficients, items of information on temporary danger points and road conditions or weather conditions, which are required for interpreting and evaluating a surroundings model in accordance with the surroundings of the vehicle, before an intervention may be made in a vehicle dynamics control system. For this purpose, it is generally necessary for secure and interruption-free communication at a high data rate to be ensured via a communication network between the vehicle and a server, which provides the above-mentioned values and items of information. Known mobile communication networks are being expanded for such future requirements for data rates and availability, for example, based on 5G mobile communication standard.

For example, to implement a 5G mobile communication network, new transceiver stations and mobile terminals having many more MIMO (multiple input multiple output) antennas than presently available mobile terminals have, a much higher geographic density of base stations having much smaller radio radii, and much broader frequency spectra in the air are generally required.

Smaller radio radii generally result in a continuous change of the radio cells, in particular at higher travel velocities of the vehicle. Therefore, interruptions of the data link and in particular lengthening of the response times are increasingly to be expected.

SUMMARY

An object of the present invention may therefore be to provide a method for operating a terminal for a communication network, which overcomes conventional disadvantages and enables a high level of communication availability and preferably avoids interruptions in a data link.

An object of the present invention may also be to provide a corresponding terminal for a communication network, a method for operating a radio cell management server, a radio cell management server, a vehicle, and a computer program.

These objects may be achieved with the aid of the present invention. Advantageous embodiments of the present invention are described herein.

According to one aspect of the present invention, a method for operating a terminal for a communication network is provided, the terminal, based on a future route of the terminal, transmitting a reservation request for logging into a radio cell of the communication network along the route via the communication network to a radio cell management server, to be able to log into the requested radio cell as a function of a response of the radio cell management server.

According to another aspect, a method is provided for operating a radio cell management server for radio cells of a communication network, the radio cell management server receiving a reservation request for logging into a radio cell from a terminal via the communication network, the radio cell management server checking whether logging into the radio cell is possible or not in accordance with the reservation request, the radio cell management server transmitting a corresponding response via the communication network to the terminal as a function of the check, that logging into the requested radio cell is possible or is not possible.

According to another aspect, a terminal for a communication network is provided, including a processor, which is designed, based on a future route of the terminal, to ascertain a reservation request for logging into a radio cell of the communication network along the route, and a communication interface, which is designed to transmit the reservation request to a radio cell management server via the communication network, so that the terminal may log into the requested radio cell as a function of a response of the radio cell management server.

According to still another aspect, a radio cell management server for radio cells of a communication network is provided, including a communication interface, which is designed to receive a reservation request for logging into a radio cell via the communication network from a terminal, and a processor, which is designed to check whether logging into the radio cell is possible or not in accordance with the reservation request, the processor furthermore being designed to ascertain a corresponding response, as a function of the check, that logging into the requested radio cell is possible or is not possible, the communication interface furthermore being designed to transmit the response via the communication network to the terminal.

According to still another aspect, a vehicle is provided, which includes the terminal according to the present invention.

According to still another aspect, a computer program is provided, which includes program code for carrying out the method for operating a terminal for a communication network and/or for carrying out a method for operating a radio cell management server for radio cells of a communication network when the computer program is executed on a computer.

The present invention thus in particular includes carrying out predictive radio cell reservation along a route of the terminal, for example, a travel route of the vehicle. The radio cell is reserved for the terminal. A capacity is thus kept ready for the terminal, for example, a transmission and/or data capacity. This is because in general only a limited number of users or terminals may log into a radio cell at the same time. It is ensured by the reservation that further users may no longer log into the radio cell if the maximum number of users logged into the radio cell would thus be exceeded, although present capacities would still be available. This is because these capacities have been reserved for the requesting terminal. Availability with respect to a communication is thus advantageously ensured.

The radio cell of the reservation request is a radio cell, which the terminal wishes to log into in the future. This is because this radio cell is located along the future route of the terminal. For the reservation request, the terminal is located in a radio cell which is located before the requested radio cell with respect to the future route, in particular immediately before the requested radio cell with respect to the future route.

According to one specific embodiment, the terminal is a mobile terminal, for example, a mobile phone, preferably a smart phone.

In another specific embodiment, the terminal is installed in the vehicle. Therefore, for example, vehicle-based services or vehicle-based functions are also possible, which require a data link to a cloud infrastructure via the communication network.

When reference is made specifically to a mobile terminal in light of this description, this should always be understood to also mean the more general form of the terminal.

In one specific embodiment, multiple radio cells are reserved, which are located along the future route. The principle of predictive radio cell reservation for one radio cell is thus preferably expanded to multiple radio cells.

According to one specific embodiment it is provided that, if the response includes the fact that logging into the requested cell is not possible, the terminal requests, as a function of the response, future required data via the communication network from a network server infrastructure. This yields the technical advantage in particular that the terminal makes itself independent of the fact that logging into the requested cell is not possible. This is because the future required data have already been requested. Such a request for future required data may also be referred to as a so-called "prefetch". Data are thus requested which are not presently required, but of which it is foreseeable that they will be required in the future. However, because logging into the requested radio cell is not possible, these data could not be requested if the terminal, preferably the mobile terminal, were located within the radio cell. According to the present invention, these data are requested before the terminal is located within the radio cell.

Data within the meaning of the present invention are, for example, friction coefficient data, data on temporary hazard points along the route, data on road conditions of the route, weather data, in particular weather condition data, i.e., in particular data in general which may be used for an interpretation and an evaluation of a surroundings model, which corresponds to the surroundings of the vehicle. This is thus before interventions are carried out in a vehicle dynamics control system of the vehicle. Data include, for example, navigation data and/or traffic data.

The requested future data are received in particular by the terminal with the aid of the communication interface and, according to one specific embodiment, in particular buffered, for example, buffered or stored in a memory, in particular in the vehicle. This is carried out until a data communication, in particular with the network server infrastructure, is possible again. Such a memory may also be referred to as a data battery.

A network server infrastructure in the meaning of the present invention includes, for example, one or multiple network servers, in particular, the network server infrastructure is formed as a cloud infrastructure, in particular as a data cloud.

In another specific embodiment it is provided that the terminal is moved along the route (for example, with the aid of the vehicle, for example, because it is installed in the vehicle) and changes from one radio cell to a next radio cell during the movement, the radio cell of the reservation request corresponding to the radio cell which immediately follows the radio cell in which the terminal is presently located.

This yields the technical advantage in particular that interruption-free so-called mobile cell hopping is possible. The wording "mobile cell hopping" is the English-language term for changing from one radio cell to the next radio cell when the terminal moves or is moved.

According to one specific embodiment, the future route is provided with the aid of a navigation system. This means in particular that the radio cell which immediately follows the present radio cell in which the terminal is presently located may thus be ascertained based on the route data provided with the aid of the navigation system, which correspond to the route.

According to another specific embodiment it is provided that the reservation request includes a time when the terminal wishes to log into the radio cell. This yields the technical advantage in particular that the radio cell only has to be reserved for the terminal for a certain time. Optimal utilization of the radio cell is therefore advantageously enabled.

According to one specific embodiment it is provided that the response includes the period of time for which the requested radio cell is reserved for the terminal for logging in. This yields the technical advantage in particular that the terminal is informed about the period of time for which the requested cell is reserved for the terminal for logging in. The terminal is therefore advantageously made capable of estimating whether it will still reach the requested radio cell in due time. It is provided in particular that the reservation is adapted accordingly if needed. This means that the terminal may thus transmit a new reservation request to the radio cell management server if the terminal no longer reaches the radio cell in due time, i.e., for the period of time for the purpose of logging in.

The mobile terminal is, in one specific embodiment, a mobile phone, in particular a smart phone.

According to one specific embodiment, the communication network is a mobile communication network, in particular a 4G or 5G network.

Functionalities of the terminal and the radio cell management server result similarly from the functionalities of the corresponding method and vice versa. This means in particular that device features of the terminal and of the radio cell management server thus result similarly from the corresponding method features and vice versa.

The present invention is explained in greater detail below on the basis of preferred exemplary embodiments.

DETAILED DESCRIPTION OF EXAMPLE EMBODIMENTS

Figure 1:
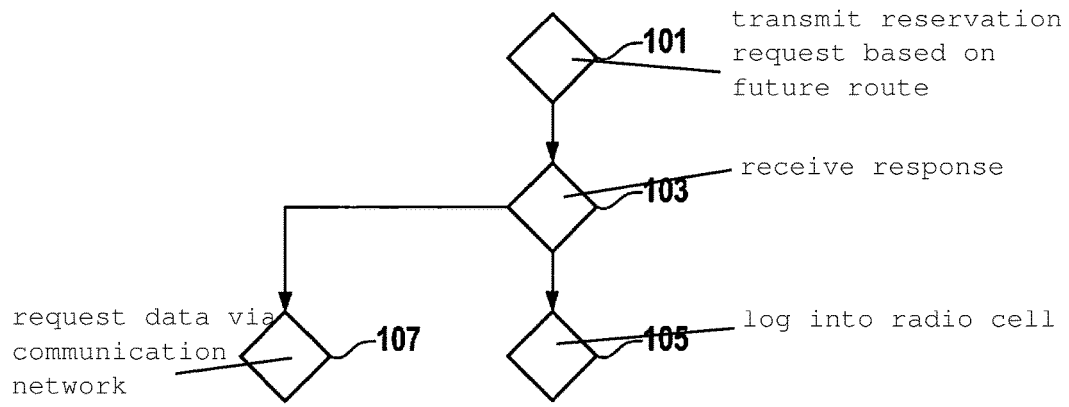
FIG. 1 shows a flow chart of a method for operating a terminal.

FIG. 1 shows a flow chart of a method for operating a terminal for a communication network.

In a step 101, the terminal, which is a mobile terminal according to one specific embodiment, transmits, based on a future route of the terminal, a reservation request for logging into a radio cell of the communication network along the route via the communication network to a radio cell management server. In a step 103, the terminal receives a response of the radio cell management server via the communication network. If the response includes the fact that logging into the requested cell is possible, the terminal thus logs into the requested radio cell according to a step 105. This is carried out when the terminal is located in radio range or within the radio cell.

If the response includes the fact that logging into the requested cell is impossible, according to a step 107, the terminal thus requests future required data via the communication network from a network server infrastructure as a function of the response.

Figure 2:
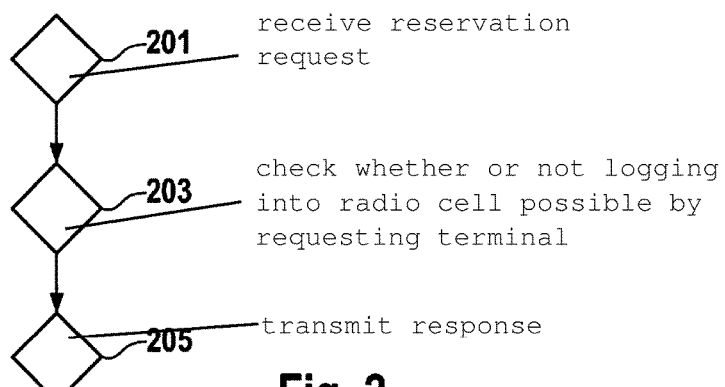
FIG. 2 shows a flow chart of a method for operating a radio cell management server.

FIG. 2 shows a flow chart of a method for operating a radio cell management server for radio cells of a communication network.

In a step 201, the radio cell management server receives, via the communication network, a reservation request for logging into a radio cell from a terminal, which is a mobile terminal, for example.

According to a step 203, the radio cell management server checks whether logging into the radio cell is possible on the part of the terminal or not in accordance with the reservation request. In a step 205, the radio cell management server transmits a corresponding response via the communication network to the terminal as a function of the check, that logging into the requested radio cell is possible or is not possible, i.e., is impossible.

Figure 3:
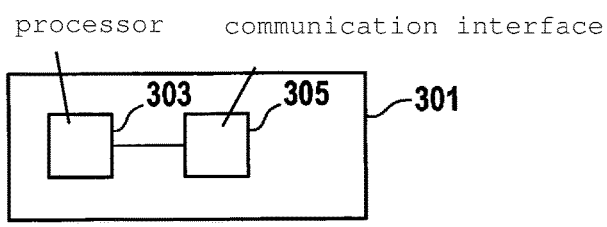
FIG. 3 shows a terminal for a communication network.

FIG. 3 shows a terminal 301 for a communication network.

Terminal 301 includes a processor 303, which is designed, based on a future route of terminal 301, to ascertain a reservation request for logging into a radio cell of the communication network along the route. Terminal 301 furthermore includes a communication interface 305, which is designed to transmit the reservation request to a radio cell management server via the communication network, so that terminal 301 may log into the requested radio cell as a function of a response of the radio cell management server (and also does so if the response is positive, i.e., the radio cell is reserved). The communication interface is thus designed in particular to receive a corresponding response of the radio cell management server via the communication network. A negative response means that logging in is not possible, the radio cell was not reserved. In the event of a negative response it is provided in particular that future required data are requested (prefetch).

Terminal 301 is, for example, a mobile terminal. The terminal is installed in a vehicle, for example.

Figure 4:
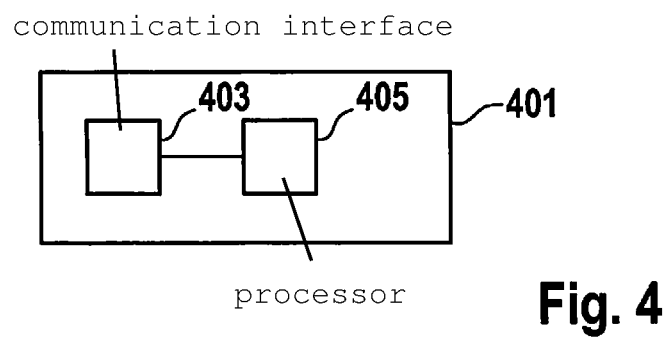
FIG. 4 shows a radio cell management server.

FIG. 4 shows a radio cell management server 401 for radio cells of a communication network.

Radio cell management server 401 includes a communication interface 403, which is designed to receive a reservation request for logging into a radio cell via the communication network from a terminal. Radio cell management server 401 furthermore includes a processor 405, which is designed to check whether, in accordance with the reservation request, logging into the radio cell on the part of the terminal is possible or not, processor 405 furthermore being designed to ascertain a corresponding response as a function of the check, that logging into the requested radio cell is possible or is not possible, i.e., is impossible. Communication interface 403 is designed to transmit the response via the communication network to the terminal.

Figure 5:
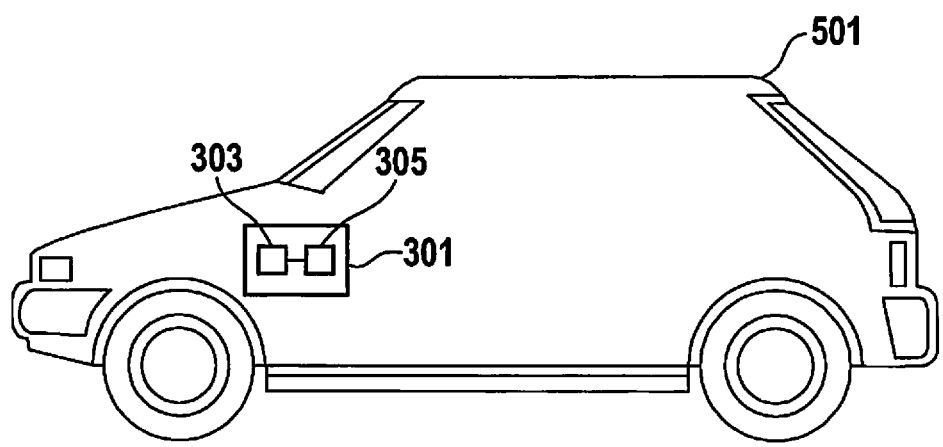
FIG. 5 shows a vehicle.

FIG. 5 shows a vehicle 501, which includes terminal 301 of FIG. 3. For example, terminal 301 is installed in the vehicle. For example, terminal 301 is a mobile terminal, which is installed in the vehicle.

According to the present invention includes a predictive radio cell reservation along a route, in particular a travel route of the vehicle, to thus advantageously ensure availability of the communication interface. If a reservation is not possible, it is thus provided according to the present invention that a prefetch of the required future data is carried out, which may ensure data availability and data consistency.

The present invention is particularly advantageously usable in 5G mobile communication networks, which is thus provided according to one specific embodiment, i.e., use in a 5G mobile communication network.

A 5G mobile communication network includes, for example, a spectrum from 300 MHz to 300 GHz, which may be used flexibly in particular. For comparison, an LTE mobile communication network uses, at least in Germany, three fixed frequency blocks at 800 MHz, 1800 MHz, and 2600 MHz. The remaining 297 GHz are presently not yet even activated for terrestrial mobile communication.

A route of the terminal, in particular a travel route of the vehicle including the terminal, is preferably covered by multiple radio cells. This means that multiple radio cells are thus located along the route, in particular the travel route. This is also the case in particular if the communication network is a 3G or 4G mobile communication network. For example, if the radio cells are located at a distance of, for example, less than 50 m, when traveling at 100 km/h, the vehicle is thus located in a radio cell for less than 60 seconds. The steps required for the mobile cell hopping take place in this time: a connection establishment including a handshake, a data transmission, and a connection release from the radio cell.

In order that such mobile cell hopping may function without interruption, it is provided according to the present invention that the next radio cell to be approached is reserved, in particular reserved for the vehicle including the terminal. This takes place in particular with the aid of route planning, which is carried out with the aid of a navigation system, for example. This means that the next radio cell to be approached thus results from the planned route, in particular the planned travel route. According to the present invention it is provided that a reservation request is transmitted from the terminal, i.e., in particular from the vehicle including the terminal, to the radio cell management server, which may be part of a mobile communication infrastructure of a mobile network operator. The radio cell management server checks the reservation and occupies or reserves the cell, i.e., the radio cell, for the terminal, i.e., in particular for the vehicle, preferably in a certain time window or period of time. This means in particular that the radio cell management server thus reserves or occupies the radio cell for the terminal, in particular for the vehicle, and does so in particular for a certain time window or period of time. Of course it is preferably provided that in spite of the occupation or reservation, still further terminals, for example, mobile terminals, may also log in, as long as a maximum occupation capacity is not exceeded. This means that according to one specific embodiment, the radio cell is not only exclusively reserved for the requesting terminal.

If this predictive radio cell reservation is not possible, because the radio cell is already fully occupied, for example, this is communicated to the terminal, in particular the vehicle, with the aid of a corresponding response. Due to the reception of this response, the terminal transmits a request to a network server infrastructure, to obtain future required data therefrom. The terminal thus requests future required data from the network server infrastructure. This may also be referred to as a prefetch.

The requested future data are in particular received by the terminal with the aid of the communication interface and in particular buffered according to one specific embodiment, for example, buffered in a memory, in particular in the vehicle. This takes place in particular until a data communication is again possible, in particular with the network server infrastructure. Such a memory may also be referred to as a data battery.

In summary, the present invention thus provides a predictive reservation of radio cells, in particular mobile radio cells, for interruption-free communication with a data cloud (in general with a network server infrastructure).

What is claimed is:

1. A method for operating a terminal for a communication network, comprising:
    transmitting via the communication network by the terminal to a radio cell management server, based on a future travel route of the terminal, a reservation request for logging into a radio cell of the communication network located along the future travel route, to be able to log into the requested radio cell as a function of a response of the radio cell management server;
    receiving, by the terminal from the radio cell management server, an indication of a period of time for which the requested radio cell is reserved for the terminal for logging into the requested radio cell;
    determining, by the terminal, that the terminal will not reach the requested radio cell in the period of time; and
    transmitting, by the terminal to the radio cell management server, an adapted reservation request based on the determining.

2. The method as recited in claim 1, wherein, if the response from the radio cell management server includes the fact that logging into the requested cell is not possible, the terminal requests future required data via the communication network from a network server infrastructure as a function of the response.

3. The method as recited in claim 1, wherein the terminal is moved along the route and changes from one radio cell to a next radio cell during the movement, the radio cell of the reservation request corresponding to the radio cell which immediately follows the radio cell in which the terminal is presently located.

4. The method as recited in claim 1, wherein the reservation request includes a time when the terminal wishes to log into the radio cell.

5. A method for operating a radio cell management server for radio cells of a communication network, the method comprising:
    receiving from a terminal via the communication network by the radio cell management server, a reservation request for logging into a radio cell located along a future travel route of the terminal, wherein the terminal from which the reservation request is received is approaching a radio cell and is outside the radio cell;
    checking, by the radio cell management server, logging into the radio cell is possible or not in accordance with the reservation request; and
    transmitting via the communication network to the terminal by the radio cell server a corresponding response via the communication network, the response indicating that logging into the requested radio cell is possible or is not possible;
    wherein the radio cell management server transmits to the terminal, via the communication network, an indication of a period of time for which the requested radio cell is reserved for the terminal for logging into the requested radio cell;
    wherein the radio cell management server receives, from the terminal via the communication network, and adapted reservation request based on the terminal determining that the terminal will not reach the requested radio cell in the period of time.

6. The method as recited in claim 5, wherein the response includes a time period for which the requested radio cell is reserved for the terminal for logging in.

7. A terminal for a communication network, comprising:
    a processor designed to ascertain, based on a future travel route of the terminal, a reservation request for logging into a radio cell of the communication network located along the future travel route; and
    a communication interface designed to transmit the reservation request to a radio cell management server via the communication network, so that the terminal may log into the requested radio cell as a function of a response of the radio cell management server;
    wherein the terminal receives, via the communication network from the radio cell management server, an indication of a period of time for which the requested radio cell is reserved for the terminal for logging into the requested radio cell;
    wherein the terminal determines if the terminal will reach the requested radio cell in the period of time; and
    wherein the terminal transmits, via the communication interface to the radio cell management server an adapted reservation request if the terminal determines that the terminal will not reach the requested radio cell in the period of time.

8. A radio cell management server for radio cells of a communication network, comprising:
    a communication interface designed to receive, via the communication network, a reservation request from a terminal for logging into a radio cell located along a future travel route of the terminal, wherein the terminal from which the reservation request is received is approaching the radio cell and is outside the radio cell; and
    a processor designed to check whether logging into the radio cell is possible or not in accordance with the reservation request, the processor further being designed to ascertain a corresponding response as a function of the check, that logging into the requested radio cell is possible or is not possible; and
    wherein the communication interface is further designed to transmit the response to the terminal via the communication network;
    wherein the terminal receives, via the communication network from the radio cell management server, an indication of a period of time for which the requested radio cell is reserved for the terminal for logging into the requested radio cell;
    wherein the terminal determines if the terminal will reach the requested radio cell in the period of time; and
    wherein the terminal transmits, via the communication interface to the radio cell management server an adapted reservation request if the terminal determines that the terminal will not reach the requested radio cell in the period of time.

9. A vehicle, comprising:
    a terminal for a communication network, the terminal including a processor designed to ascertain, based on a future travel route of the terminal, a reservation request for logging into a radio cell of the communication network located along the future travel route, and a communication interface designed to transmit the reservation request to a radio cell management server via the communication network, so that the terminal may log into the requested radio cell as a function of a response of the radio cell management server;

wherein the terminal receives, via the communication network from the radio cell management server, an indication of a period of time for which the requested radio cell is reserved for the terminal for logging into the requested radio cell;

wherein the terminal determines if the terminal will reach the requested radio cell in the period of time; and wherein the terminal transmits, via the communication interface to the radio cell management server an adapted reservation request if the terminal determines that the terminal will not reach the requested radio cell in the period of time.

10. A non-transitory computer-readable storage medium on which is stored program code for operating a terminal for a communication network, the program code, when executed by a computer, causing the computer to perform:

transmitting via the communication network by the terminal to a radio cell management server, based on a future travel route of the terminal, a reservation request for logging into a radio cell of the communication network along the future travel route, to be able to log into the requested radio cell as a function of a response of the radio cell management server;

receiving, by the terminal from the radio cell management server, an indication of a period of time for which the requested radio cell is reserved for the terminal for logging into the requested radio cell;

determining, by the terminal, that the terminal will not reach the requested radio cell in the period of time; and transmitting, by the terminal via the communication network to the radio cell management, an adapted reservation requested based on the determining.

11. The method as recited in claim 1, wherein the future travel route is a travel route determined with the aid of travel route planning by a navigation system.

12. The terminal as recited in claim 7, wherein the future travel route is a travel route determined with the aid of travel route planning by a navigation system.

13. The vehicle as recited in claim 9, further comprising:
a navigation system which determines the future travel route via travel route planning, the processor ascertaining the reservation request based on the future travel route determined by the navigation system.

14. The non-transitory computer readable storage medium as recited in claim 10, wherein the future travel route is a travel route determined with the aid of travel route planning by a navigation system.

15. The method as recited in claim 1, wherein the transmitting of the reservation request is based on a predicted position of the terminal along the future travel path.

16. The terminal as recited in claim 7, wherein the processor ascertains the reservation request based on a predicted position of the terminal along the future travel path.

17. The vehicle as recited in claim 9, wherein the terminal ascertains the reservation requested based on a predicted position of the terminal along the future travel path.

18. The method as recited in claim 1, wherein the radio cell for which the reservation is requested is a cell that the terminal is approaching and is still outside.

19. The terminal as recited in claim 7, wherein the radio cell for which the reservation is requested is a cell that the terminal is approaching and is still outside.

20. The vehicle as recited in claim 9, wherein the radio cell for which the reservation is requested is a cell that the terminal is approaching and is still outside.

* * * * *